United States Patent [19]

Scherer

[11] Patent Number: 4,951,215

[45] Date of Patent: Aug. 21, 1990

[54] LINEAL OUTPUT MEASUREMENT CIRCUIT FOR USE WITH PRODUCT CUTTING APPARATUS

[75] Inventor: Paul K. Scherer, Gardena, Calif.

[73] Assignee: Sanford-Lussieng, Inc., Los Angeles, Calif.

[21] Appl. No.: 312,491

[22] Filed: Feb. 21, 1989

[51] Int. Cl.$^5$ .......................... G06F 15/46; B26D 7/06
[52] U.S. Cl. .................................... 364/474.09; 83/74; 83/76.8; 83/425.2; 144/357; 144/378; 364/474.02; 364/551.02
[58] Field of Search ...................... 364/474.09, 474.01, 364/474.02, 550, 551.01, 551.02; 318/601, 603; 83/72, 73, 74, 76.1–76.9, 358, 359, 360, 363, 522.11, 522.29, 425.2, 425.3, 425.4; 144/356, 357, 376, 377, 378

[56] References Cited

U.S. PATENT DOCUMENTS

| | | | |
|---|---|---|---|
| 3,834,262 | 9/1974 | Lapper | 83/522.29 |
| 3,992,614 | 11/1976 | Buss | 364/474.09 |
| 4,074,601 | 2/1978 | Warren et al. | 83/425.2 |
| 4,468,992 | 9/1984 | McGeehee | 144/378 |
| 4,702,134 | 10/1987 | Corley, III | 364/474.09 X |

Primary Examiner—Joseph Ruggiero
Attorney, Agent, or Firm—Robert J. Schaap

[57] ABSTRACT

A lineal output measurement circuit adapted for use with product cutting apparatus, primarily with wood cutting apparatus of the type which have a plurality of simultaneously operable cutting elements. This product cutting apparatus is thereby capable of cutting product stock, such as ripping of a wood member simultaneously into individual wood section strips with a plurality of saw blades positioned to cut the individual strips. The apparatus generally includes some form of input mechanism for programming the cutting mechanism to produce the individual sections of product, that is, to produce the desired amount of the selected widths of product. The measurement circuit of the present invention utilizes program electrical signals from the apparatus which provide a program input representative of the different sizes of product sections to be produced, along with a port circuit and a processing means. The processing means calculates the amount of product sections cut from the product stock and generates output signals therefor.

22 Claims, 3 Drawing Sheets

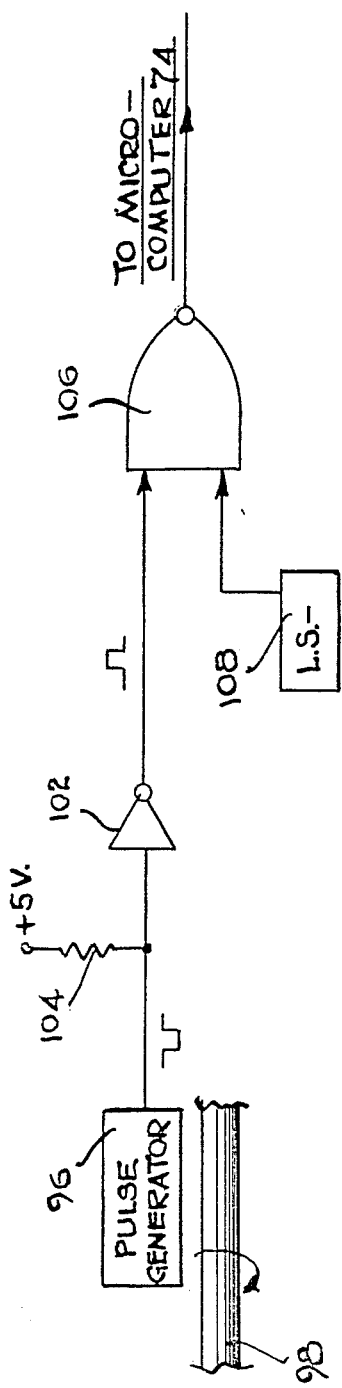
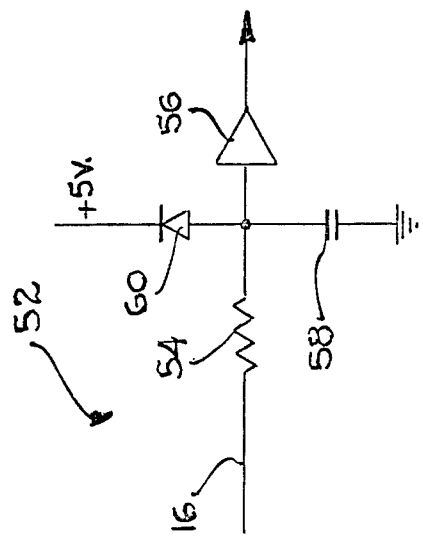
Fig. 3
Fig. 4

LINEAL OUTPUT MEASUREMENT CIRCUIT FOR USE WITH PRODUCT CUTTING APPARATUS

BACKGROUND OF THE INVENTION

1. Field of the Invention.

This invention relates in general to certain new and useful improvements in a lineal measurement circuit and method, and more particularly, to a lineal measurement circuit and method which are capable of measuring the output of a cutting apparatus capable of cutting individual product sections from a larger piece of product stock.

2. Brief Description of the Prior Art.

In the production of wood boards and strips, it is oftentimes desirable to cut several of the boards or other pieces of wood stock to desired lengths and desired widths. For this purpose, there are several types of wood cutting equipment which are capable of ripping wood, that is, cutting along the length of the grain of a piece of wood stock to obtain a desired width of wood product. Moreover, some of this wood cutting equipment is capable of simultaneously cutting a plurality of individual strips or product sections from a piece of wood stock.

One type of production machine which is capable of simultaneously cutting individual sections of wood stock to desired board widths and which board widths may differ from one another, is commercially available and known as a "selective gang rip saw". This type of device uses shadow marks which are projected onto the strip of wood which is being cut or onto a work surface to enable an operator to locate the desired widths. Thereafter, a plurality of individual strips of wood stock are sequentially moved through the saw and individually cut to desired widths and where the widths may differ from one another.

In the operation of these selective gang rip saws, the operator must pre-select the desired individual widths of the strips which are to be ripped from a wood blank or so-called "wood stock". Thus, for example, an operator may have a request for a required quantity of wood strips having a width of ½ inch, another desired quantity of wood strips having a width of 1½ inches, etc. to be cut in the selective gang rip saw. Thus, the operator will establish the spacing between each of a plurality of saw blades so as to rip an individual wood blank or stock into strips having the desired widths.

In many of these selective gang rip saws, five individual saw blades are provided such that the operator may rip a wood stock into as many as six individual strips by properly positioning the saw blades. Moreover, each of these saw blades is simultaneously rotatable and lie in planes generally parallel to one another.

One of the major problems encountered in the cutting, and particularly the ripping, of wood stock is the fact that the wood stock itself is dimensionally rough and uneven. Thus, edges of the wood stock may be non-linear. Moreover, surfaces of this wood stock itself may be marred or the stock may have other imperfections extending through the wood, such as knots or the like.

The operator of the selective gang rip saw will carefully position shadow lines representing the desired widths on the wood stock in order to obtain the optimum cuts from the wood stock. Thus, the operator may intentionally mix the widths of wood stock which are being ripped. As an example, the operator may be cutting one board into individual strips having e.g. ½ inch, 1¼ inches and 2 inches. However, after cutting of one piece of stock and because of imperfections in the next piece of stock, the operator may immediately switch and cut boards having 1⅜ inches, which may also be part of an output requirement. Thereafter, the operator would switch back to and continue with the production of the boards having widths of ½ inch, 1¼ inches and 2 inches. As a further example, on the successive wood stock, the board itself may not have sufficent wood so that in the next task, only the ½ inch and 1¼ inch wood strips may be produced thereby omitting the 2 inch strip from that particular piece of wood stock.

It can be observed that there is no means for effectively measuring the amount of the selected widths of wood strips which have been cut from the wood stock. While it is possible to install a counter on the apparatus in order to determine the lineal footage of wood stock which has passed through the cutting apparatus, it is virtually impossible, with commercially available apparatus, to determine the amounts of the individual strips which have been cut. Thus, in order for the operator to determine the desired quota for each of the individual blanks of wood strip sections has been met, it is necessary for the operator to stop the cutting operation and literally sort the various individual strips into piles of the selected desired widths and thereafter make a rough estimate of the wood section strips which have been cut. This is a particularly pronounced problem when the operator may be cutting several thousand feet of board at one width, several thousand feet of board at another width, etc.

Interference with the cutting operation to enable the operator to measure individual wood strip sections of selected widths is not only time consuming, but clearly impedes other work operations which may require the use of the wood sections cut from the wood stock. In addition, these selective gang wood saws are very expensive pieces of equipment and cost amortization is only effective when they are generally continuously operated. Hence, work stoppage for purposes of measuring is not only unproductive, but is economically undesirable.

In many cases, it is also desirable to determine the efficiency of operation using certain types of wood, as for example, from different wood vendors, or certain grades of wood, or the like. Inasmuch as the selective gang wood saws may be sequentially cutting wood stock from various sources, the output is often times mixed. As an example, an operator of one of these selective gang rip saws may be cutting wood of a first grade and immediately thereafter wood of a second grade or otherwise, cutting wood of a first load and immediately thereafter wood from a second load. Therefore, it is oftentimes difficult to determine the efficiency of operation, that is how much waste resulted from one load or grade of wood compared to another load or grade of wood.

OBJECTS OF THE INVENTION

It is, therefore, one of the primary objects of the present invention to provide a lineal measurement circuit which is capable of determining the individual amounts of product sections having individual and differing widths and which have been cut from product stock.

It is another object of the present invention to provide a lineal measurement circuit of the type stated for determining the amount of wood strips of selected widths which have been ripped from wood stock such that an accurate measurement of the amount of wood strips having various individual widths ca be provided for each such selected width of wood stock.

It is a further object of the present invention to provide a lineal measurement circuit of the type stated which is highly effective in enabling the determination of cutting efficiency in using a plurality of different pieces of product stock in a production cutting apparatus.

It is an additional object of the present invention to provide a lineal measurement circuit of the type stated which is highly effective for use in gang rip saw apparatus.

It is still another object of the present invention to provide a lineal measurement circuit of the type stated which is capable of operation with a minimum number of electrical components and which is capable of operation in factory environments.

It is another salient object of the present invention to provide a lineal measurement circuit of the type stated which is highly efficient in its operation and which requires little or no skilled operator attendance.

It is still a further object of the present invention to provide a method for simultaneously measuring the lineal output from simultaneous production stages of the production apparatus.

With the above and other objects in view, my invention resides in the novel features of form, construction, arrangement and combination of parts presently described and pointed out in the claims.

BRIEF SUMMARY OF THE INVENTION

The invention relates to a lineal measurement circuit which is capable of accurately and efficiently measuring the amount of individual sections or strips of product which have been cut from product stock. The invention is highly effective in enabling measurements of the amount of each of a number of product sections which have been cut from product stock. Preferably, the lineal measurement circuit is used with, but not limited to, measurement of wood strips produced from wood stock. Thus, in one of the preferred embodiments, the invention is effective for use with selective gang rip saws which have a plurality of cutting stages simultaneously operable to generate wood stock output of differing widths. However, as indicated, the invention is not limited to this specific application.

The wood cutting or other product cutting apparatus is usually comprised of a plurality of individual cutting elements, such as saw blades. These elements are usually simultaneously operable. In the case of the selective gang rip saw, the cutting elements are for example, five cutting blades which are simultaneously rotatable in planes generally parallel to one another. Thus, when a wood stock board is passed through the rip saw, the five blades can be selectively positioned in order to cut a total of six individual strips from this board of wood stock.

However, as indicated previously, in many cases, the wood stock has uneven edges and may have imperfections. Thus, the operator will attempt to use shadow lines in order to portray desired lines of cut on the wood stock. When the operator has obtained the most efficient cutting pattern in accordance with the arrangement of the shadow lines, he will automatically position the saw blades by operation of various manually actuable switches, typically push-button switches. The saw blades are then moved relative to one another so a to obtain the desired widths between the saw blades and thereby obtain the desired widths of the various wood segments which are to be cut or ripped from the board stock.

In the setting of the saw blades, in accordance with the arrangement of the shadow lines, the apparatus generates electrical signals which serve to provide desired positions of the saw blades. The electrical signals may also be generated by operator actuation of various switches in order to obtain the desired positioning of the saw blades. These electrical signals, in effect, serve as programming signals, since they effectively represent the desired widths of various groups of wood sections which are to be ripped from individual and sequential wood stock boards passed through the apparatus.

Production cutting apparatus of this type usually include a manually operable pin diode matrix in which the operators may place diode pins into the matrix in order to enable generation of electrical signals for movement and positioning of the saw blades. These signals are thereupon transmitted to the positioning mechanisms or so-called, "control members" which are comprised of solenoids and relay assemblies which operate cylinders to position the saw blades. Thus, each saw blade is positioned by an individual cylinder and piston arrangement and each cylinder is controlled by a plurality of solenoids and associated relays.

The lineal measurement circuit, often referred to as an "output measurement circuit", of the present invention can be broadly described as a system which connects to and receives electrical signals from the existing product cutting apparatus and utilizes the signals normally generated by that apparatus to determine the amount of product output of differing sizes. In this respect, the lineal measurement circuit comprises a means to detect or sense the sizes of the individual strips of product which are to be cut by the apparatus. In this case, the lineal measurement circuit is connected to the bank of manually actuable switches which are set by the operator of the apparatus. An encoding mechanism encodes the signals from this bank of manually actuable switches. The encoded signals are then used to identify a particular lineal output measurement device such as a read out device, e.g. a meter or guage to identify a particular size.

A bank of interface circuits is interposed between the encoder and the bank of manually actuable switches which are set by the operator of the apparatus. This bank of interface circuits effectively receive the voltages from the manually actuable switches. The bank of interface circuits further includes a plurality of individual interface circuits. As indicated, the encoder is connected to this bank of interface circuits and is also connected to a port circuit, as hereinafter described, and the output therefrom represents a selected meter which will receive data, as also hereinafter described.

The lineal measurement circuit of the present invention also includes a means to sense the position of cutting elements. For this purpose, the diode matrix is employed. A bank of interface circuits is connected to receive the plurality of electrical signals from the diode matrix. This bank of interface circuits may comprise a plurality of individual interface elements, each of which are generally designed to reduce the voltage signal received from the diode matrix to a logic level voltage, or so-called "TTL" voltage, without otherwise interfering with or disrupting the signal.

The lineal measurement circuit of the present invention literally takes advantage of the fact that the product production cutting apparatus utilizes a bank of manually actuable switches and a pin diode matrix which can be manually set by the operator of the apparatus. The lineal measurement circuit utilizes the signals from both the switches and the pin diode matrix in order to program the lineal measurement circuit. However, it should be understood that a separate programming apparatus such as a keyboard switch mechanism could be employed for this purpose.

This bank of interface circuits which receives those signals from the diode matrix effectively represents the desired width of each of the boards or other material which is to be cut in the apparatus. In essence, the signals from the switches represent a selected meter which is to receive data about sizes and the signals from the diode matrix represent the desired sizes which are to be cut in the production apparatus.

The lineal measurement circuit of the present invention, in a broad aspect, provides means to receive the information about the length of the pieces of product which have been cut. This latter means constitutes the port circuit. The port circuit receives the outputs from the encoder as aforesaid and outputs from the interface circuit connected to the diode matrix, also as aforesaid. The port circuit further receives signals from interface circuits connected to the outputs of each of the saw blade positioning mechanisms.

The port circuit is comprised of a plurality of port chips and each of these port chips has a plurality of ports for receiving the desired input signals. A first of these ports receives information directly from the encoder and which represents a selected meter for receiving data information. A second one of the ports receives the signals generated at the diode matrix and which ar adjusted by the interface circuit associated therewith. The input signal received at the port connected to the encoder, and which is often referred to as a "programming port" informs the microcomputer of the meter which is to be assigned a particular size a determined by the diode matrix circuit. This size is effectively the desired width of each of the individual strips are of wood or other product to be ripped or cut from the product stock. The second port receives those signals which represent the size to be associated with the selected meters or output devices.

The port circuit is also provided with a plurality of additional input ports which receive inputs from the saw blade positioning mechanisms. The first two ports effectively receive program information, that is assignments of selected meter or output device and assignments of selected widths or sizes with each one individual widths or sizes to be associated with a particular meter. The additional input ports will receive actual operating data from the cutting operatus.

In the case of a cutting apparatus having five individual saw blades, there will be five individual saw blade positioning mechanisms, as for example, the associated relays and solenoids which operate pneumatic or hydraulic positioning cylinders. These latter signals, which are received by the port circuit, effectively identify the actual positions of the saw blades.

The lineal measurement circuit of the present invention, also in a broad aspect, comprises a means to receive information about the length of each of the pieces of product which are to be cut and the production cutting apparatus. This latter means may adopt a form of an interrupt circuit used in the lineal measurement circuit of the present invention. This interrupt circuit includes a means for measuring the movement of a movable member in the cutting apparatus. This movable member, may be for example, a roller or other member. The means for measuring the movement is a type of encoder which is capable of generating pulses proportional to the amount of product stock passing through the cutting apparatus. Thus, a commercially available encoder could possibly be used with in this circuit. However, any device which generates pulse or electrical signals representing the amount of lineal measurement of the product passing through the cutting apparatus could be used.

In the specific embodiment employed, a pulse generator is employed for generating electrical pulses corresponding to the rotation and hence the actual lineal amount of product stock passing through the apparatus. These pulses are then detected by a microcomputer, as hereinafter described. A separate limit switch is associated with the interrupt circuit in order to determine the time during which a measurement commences and ends for each cutting element and thereby starts and ends the output signals.

The lineal measurement circuit of the present invention also can be broadly considered to comprise a means to combine the length of material with information about the correct sizes. This means may constitute the port circuit, as aforeoresaid, operating in conjunction with the processing means. A processing means receives the output from the interrupt circuit. The processing means also receives inputs from the port circuit and particularly, the signals representing the actual positions of the saw blades which are derived from the saw blade positioning mechanisms. The processing means may be preferably in the form of a micro-computer having its own internal storage capability.

The processing means thereafter calculates the amount of product section for each of the desired dimensions or widths which have been cut from the product stock. In the embodiment of the invention which relates specifically to a wood cutting apparatus, the processing means calculates the wood length output for each width of wood which has been cut and generates a separate wood length measurement signal for each of the various widths of wood strips which have been cut.

In effect, the lineal measurement circuit of the present invention senses the position of each of the cutting elements and compares that position with that previously programmed into the processing means. There is a comparison with the length of the product then being cut in the apparatus. An output is then sent to an output measurement circuit. In substance, it can be observed that the lineal measurement circuit of the present invention comprises a means to sense the sizes which are to be recorded and to select a particular output device to record the amount of each size which has been cut. The measurement circuit comprises a means to sense when the sizes are being cut and to direct that information ultimately to a particular output device. The circuit also comprises a means to receive information about the length of each of the pieces being cut, such as the interrupt circuit. Finally, the circuit comprises a means to combine all of this information, as for example, from the port circuit and the processing means.

The output measurement circuit of the present invention can be added to existing production apparatus at a relatively low cost, or otherwise, it can be installed in new production apparatus as it is being constructed. Specifically, this type of output measurement circuit readily lends itself to inclusion in a wood cutting apparatus. Thus, the present invention relates not only to the output circuit per se, but also to a production apparatus which utilizes this output circuit.

This invention possesses many other advantages and has other purposes which may be made more clearly apparent from a consideration of the forms in which it may be embodied. These forms are shown in the drawings forming a part of and accompanying the present specification. They will now be described in detail for purposes of illustrating the general principles of the invention, but it is to be understood that such detailed description is not to be taken in a limiting sense.

BRIEF DESCRIPTION OF THE DRAWINGS

Figure 1:
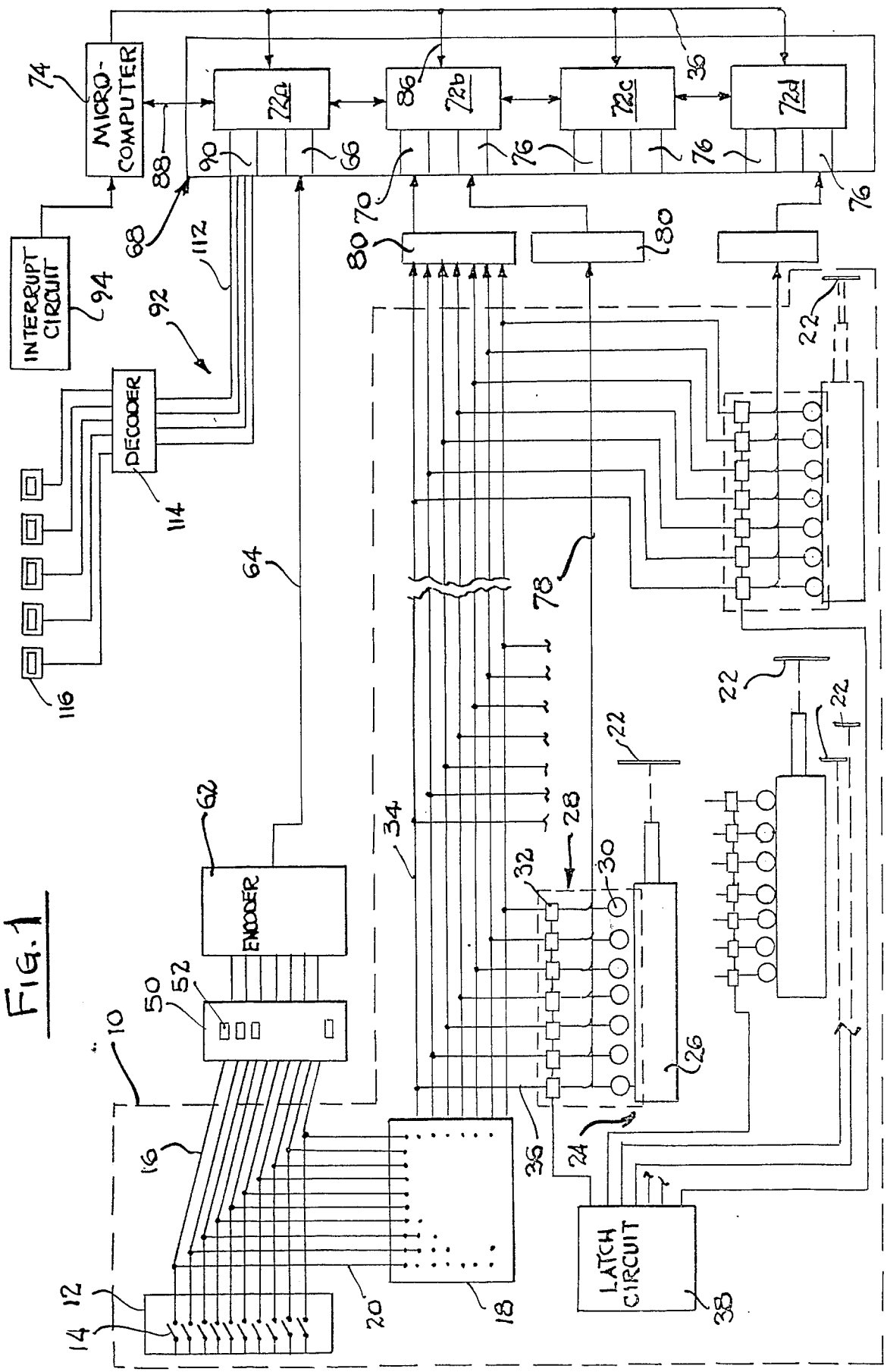
Figure 2:
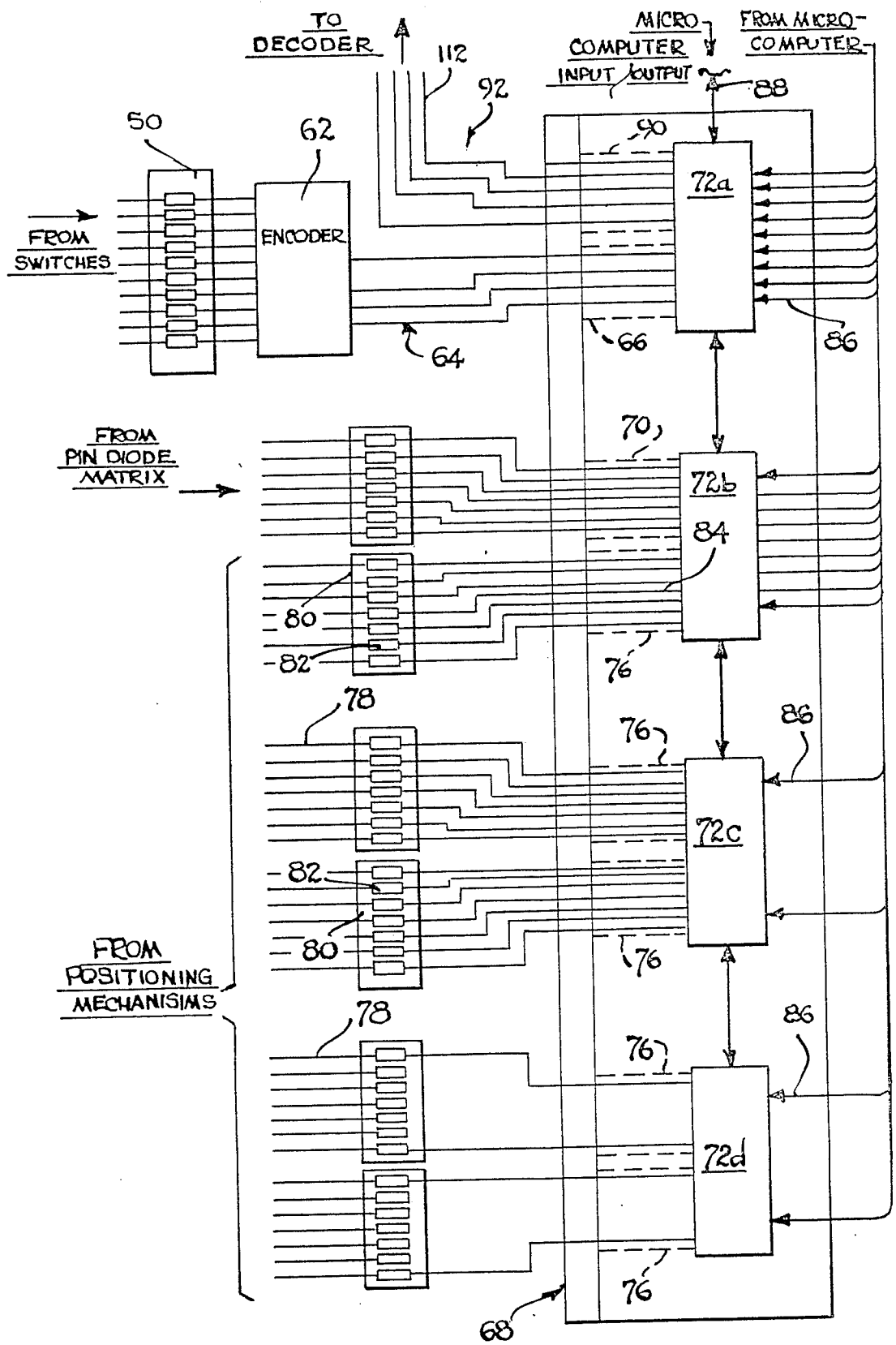

Having thus described the invention in general terms, reference will now be made to the accompanying drawings (three sheets) in which:

FIG. 1 is a schematic electrical circuit illustration showing the electrical components and the major cutting element positioning mechanisms forming part of a production cutting apparatus and the lineal measurement circuit of the present invention connected thereto;

FIG. 2 is a schematic circuit illustration showing, in more detail, the electrical circuit arrangement of the lineal measurement circuit of the present invention and it's association with the product, cutting apparatus;

FIG. 3 is a schematic circuit view of an interrupt circuit forming part of/ the lineal measurement circuit of the present invention; and /

FIG. 4 is a schematic circuit diagram of an interface circuit forming part of the lineal measurement circuit of the present invention.

DETAILED DESCRIPTION OF A PREFERRED EMBODIMENT

Referring now in more detail and by reference characters to the drawings, FIG. 1 illustrates a portion of a wood cutting apparatus and particularly a selective gang rip saw. The selective gang rip saw is shown in the dotted lines in FIG. 1 and is represented by reference numeral 10.

Only a portion of the circuit of the selective gang rip saw has been illustrated and particularly, that portion which interfaces with the lineal measurement circuit of the present invention. Moreover, only the mechanical components necessary for the cutting of the actual product, such as wood stock, have been illustrated in schematic form including for example, the cutting elements and the postitioning mechanisms associated therewith.

It should be understood that the present invention is useful in the cutting of a large number of materials. However, the present invention has been illustrated and exemplified only in terms of a selective gang rip saw for the cutting of wood stock. Naturally, other materials, such as plastic sheets and the like could also be cut by using a similar cutting mechanism and which is capable of measuring the sections of various product output therefrom.

The wood cutting apparatus 10 comprises a switch bank 12 having a plurality of manually actuable switches 14. In the embodiment as illustrated, there are provided ten manually actuable switches. The actuation of the manually actuable switches 14 by an operator generates a plurality of elecrical signals, often referred to as "first electrical signals" or so-called "program signals" and which are transmitted over conductors 16. These electrical signals effectively represent the desired widths of product sections which are to be ripped or cut from the product stock. In this case, the electrical signals carried on the conductors 16 represent the desired spacing or widths of each of the strips of wood which are to be cut from wood stock.

In many of the conventional wood ripping apparatus, there are, for example, five wood cutting elements and each operates in parallel relationship, generally simultaneously with one another. Thus, individual lengths of wood may be cut or ripped to desired widths. In each of these wood cutting stations, successive lengths of wood stock are passed into cutting blades and are individually cut to a desired width. As an example, an operator may operate the apparatus to cut lengths of wood of a first width of e.g., 1/16th inch. Simultaneously, the next adjacent strip of wood may be cut to a width of e.g. $\frac{1}{8}$th inch; and the next adjacent strip of wood may be cut to a width of e.g. $\frac{1}{4}$th inch; and the next adjacent strip of the wood may be cut to a width of e.g. $\frac{1}{2}$ inch; and the last strip of wood may be cut to a width of e.g. one inch. Naturally, the wood cutting apparatus can be constructed with any desired number of elements.

The operator of the wood cutting apparatus will actuate the various switches 14 in the bank 12 in order to obtain the desired widths of the wood strips to be cut. Inasmuch as five cutting elements can be individually pre-set to desired cutting widths, so that the wood introduced into the apparatus can be cut to different pre-set widths, one operator can cause simultaneous ripping of one piece of wood stock into six groups of wood strips, each having differing widths. Moreover, because the widths of wood which are ripped may change from one piece of wood stock to the next, depending upon the quality of each successive piece of wood stock, it is difficult to keep track of the amount of each section or strip of each width of wood which has been cut.

Actuation of the switches 14 in the switch assembly 12 will also generate electrical signals with respect to a diode matrix 18. In this case, there are seven diodes by twenty diodes in a rectangular array of diodes, or a total of one hundred forty diodes in the matrix. The diode matrix in this case is a manually actuable pin diode matrix. In this way, the operator or other user or programmer of the apparatus may insert the pin diodes in the desired position of the diode matrix. In this case, the horizontal rows represent positions corresponding to the number of manually actuable switches which may be available. The vertical columns correspond to the desired widths. The output of the diodes generate electrical signals which are used, in this case, to position the saw blades in order to cut, that is rip, the wood to desired widths. The outputs from the switches 14 to the diode matrix are carried on twenty individual conductors 20 since there are twenty diode buses.

The wood cutting apparatus 10 is also comprised of five individual saw blades, as aforesaid, and these saw blades are individually represented by reference numeral 22. Furthermore, each of these saw blades are positioned relative to one another in order to provide the proper widths of the wood strips to be ripped from a piece of wood stock, and the positioning is accomplished by an associated positioning mechanism 24.

Two of these positioning mechanisms 24 are illustrated in detail in FIG. 1. However, it should be understood that each saw blade has its own associated positioning mechanism for accurately positioning the saw blade 22 relative to the next adjacent saw blade. Also, in FIG. 1, the individual saw blades are not shown as being parallel to one another as would be required in order to provide parallel cuts. However, it should be understood that in actual construction, each of the saw blades would be located in parallel relationship for providing simultaneous parallel cuts or rips in the wood stock.

Each saw blade 22 is positioned by a hydraulic or pneumatic cylinder arrangement 26. In this case, five individual cylinders have been shown for positioning each of the individual saw blades 22. In actual construction, most of the commercially available selective gang rip saws utilize a single cylinder construction having individual concentric cylinders which are extendable therefrom with each extendable cylinder individually moving one saw blade. However, for purposes of illustration and more fully appreciating the present invention, five such positioning cylinders have been shown.

In this case, each positioning mechanism 24 comprises a control member 28 for operating the cylinder 26. The control member 28 is comprised of a plurality of individual solenoids 30 and associated relays 32, in the manner as best illustrated in FIG. 1 of the drawings. Actuation of the solenoids will cause movement of the piston forming part of the cylinder 26 and thereby cause movement of the associated saw blade 22.

The output matrix 18 is provided with conductors 34 (seven as shown) as illustrated in FIG. 1. The individual relays 32 of each positioning mechanism 24 are connected to a respective one of the output conductors 34 by means of conductors 36 and which carry additional electrical signals generated by the apparatus and which often are referred to as second electrical signals. These latter electrical signals effectively represent the position of the individual saw blade. Thus, it can be observed that five individual sets of seven conductors would extend to the various five positioning mechanisms 24 since there are five cutting elements illustrated.

The various banks of relays 32 for each positioning mechanism 24 are connected to a latch circuit 38. In accordance with this construction, the various positioning mechanisms 24 obtain their saw blade position instructions through the conductors 34 and 36 from the diode matrix 18. Thus, the latch circuit 38 will effectively hold the relay and the solenoid in the desired position after instructions have been effectively transmitted to the cylinder 26.

In accordance with the above identified construction, it can be observed that the first positioning mechanism 24, as illustrated receives its positioning instructions from the diode matrix 18 and thereafter is operated effectively through the latch circuit 38. Thereafter, the second positioning mechanism 24 will similarly receive its positioning instructions and which instructions may be different from those transmitted to the first positioning mechanism 24 from the control diode matrix 18 and so forth. Thus, the latch circuit 38 holds the individual relays 32 and solenoids 30 in the selected positions in accordance with the electrical signals (second electrical signals) received from the diode matrix 18.

The above identified description constitutes the basic portions of the commercially available production cutting apparatus insofar as they pertain to the lineal measurement circuit of the present invention. It should be understood that this commercial production apparatus includes numerous other circuit arrangements which have not been shown since they are not necessary for operation of the lineal measurement circuit. In like manner, these production cutting apparatus include other mechanical assemblies and sub-assemblies which are not necessary for illustration nor description. Thus, the commercial production cutting apparatus identified by reference numeral 10 is neither illustrated nor described in any further detail herein inasmuch as it is essentially conventional in its operation and construction.

The output measurement circuit of the present invention is now described in its relationship to the commercial production cutting apparatus. The lineal measurement circuit of the present invention comprises a first interface circuit bank 50 which is, in turn, comprised of individual interface circuits 52. Thus, a single interface circuit 52 would be provided for each of the conductors 16. The interface circuit bank 50 is designed to reduce the operating voltage level of the cutting apparatus to an acceptable logic voltage level, as aforesaid. As an example, the production apparatus may often operate at a voltage level of about thirty-two volts and the interface circuit of the present invention is uniquely designed to reduce that level to, for example, a five volt level, without any destruction or distortion of the signal.

One such interface circuit 52 is more fully illustrated in FIG. 4 of the drawings. This interface circuit 52 for example, receives a signal from the conductor 16 through a current limiting resistor 54. The output of the resistor 54 is introduced into a C-Mos buffer 56. A capacitor 58 is connected to the input of the buffer 56 and furthermore, a diode 60 is connected to a five volt source of power and which eliminates any voltages over five volts. The C-Mos buffer 56 is thereupon connected to an encoder 62 in the particular arrangement as illustrated in FIG. 1.

The encoder 62 is generally of conventional arrangement and is designed to effectively handle the voltage signals which are derived through the switch bank 12. Each of the other interface circuits as hereinafter described, are similar to the interface circuit 52 as illustrated in FIG. 4. However, the outputs of these other interface circuits would be effectively connected to a port of a port circuit as hereinafter described.

The signals from the bank of interface circuits and the encoder 62 effectively form program signals for operation of the lineal measurement circuit. Moreover, the signals on the conductors 34 from the pin diode matrix 18 also effectively constitute program signals. The program signals on the four conductor bus 64 may often be referred to as "first program signals" and the signals on the seven conductors 34 may often be referred to as "second program signals".

The signals of the four-conductor bus 64 are connected to a program input port 66 of a port circuit 68. In like manner, the program signals on the conductors 34 are connected to a second port 70 of the port circuit 68. This port 66 may often be referred to as a first program port and the port circuit 68 may be referred to as a second program port. The information from the two ports 66 and 70, in combination, are effective for programming a microcomputer 74 with regard to the various desired widths of each of the sections of wood strips which are to be cut from sequential lengths of stock.

The details of the port circuit 68 are hereinafter described and are more fully illustrated in FIG. 2 of the drawings. The port circuit 68 is actually comprised of four port chips 72a, 72b, 72c and 72d. The port 68 constitutes one of the ports on the chip 72a and the other of the ports on this chip actually functions as an output port. In like manner, the port 70 forms one of the ports on the chip 72b which also has another input port 76. Each of the remaining port chips 72c and 72d are also provided with pairs of additional input ports 76 as shown.

The five additional ports 76 are each designed to receive inputs from the five control members 28 associated with each of the positioning mechanisms 24. In this case, each positioning mechanism 24 is provided with a bus 78 comprised of seven conductors, which are connected to the respective seven conductors 36 at points intermediate the relays 32 and the solenoids 30, as best illustrated in FIG. 1. Thus, each control member 28 will have seven conductors 78 extending therefrom to individual interface circuit banks 80. In this case, each interface circuit bank 80 is similar to the previously described interface circuit bank 50 and is also comprised of individual interface circuits 82. Further, as indicated above, each of these individual interface circuits 82 are similar to the previously described interface circuits 52 as illustrated in FIG. 4 of the drawings.

The port chips 72a, 72b, 72c and 72d each receive address and control input signals from the microcomputer 74 through address and control signal conductors 86. Furthermore, each port chip 72 receives an input data over a bi-directional bus 88 from the microcomputer 74. In like manner, each port chip 72 is provided with output data ports for sending output data over the bus 88 connected to the microcomputer 74 in the manner as illustrated in FIGS. 1 and 2 of the drawings. Thus, data travels to and from the microcomputer 74 via the bus 88 and the control signals and address signals are provided to the port chips 72 through the conductors 86.

In effect, the microcomputer 74 is looking at the signals introduced into each of the port chips 72. Polling is conducted by the microcomputer 74 through the address and control bus 86. The microcomputer, in effect, selects each of the ports sequentially and determines what information exists in that port. To the extent that information exists on that port with regard to a particular output device for which polling is being conducted, then that information is returned to the computer 74 via the data bus 88. Thus, in effect, the microcomputer 74 conducts a continuous polling operatic. The microcomputer 74, effectively examines each port on a sequential basis and looks for any signal regarding e.g. a one-eighth inch board width, a one-sixteenth inch board width, etc. For any signal regarding a selected width, data is introduced directly into the microcomputer 74 via the bus 88.

Referring now to FIG. 2, it can be observed that there are five interface circuits 80, each one of which is associated with one of the individual five positioning mechanisms 24. Each one of these individual interface circuits 80 is connected to an individual port 76 on the port circuit 68, in the manner as illustrated in FIGS. 1 and 2 of the drawings. The port chip 72a is provided with an output port 90 and which is connected to an output circuit 92 as hereinafter described in more detail. The microcomputer 74 also receives an input from an individual interrupt circuit 94 and which is best illustrated in FIG. 3.

The interrupt circuit 94 generally comprises a pulse generator 96 which is located in a sensing arrangement with respect to a movable member 98. In this particular case, the pulse generator operates in conjunction with the moveable member 98, which is in the form of a rotating shaft forming part of the production cutting apparatus. In the embodiment of the production apparatus, the product stock is passed over the shaft 98 and hence, the amount of rotation of this shaft is a direct measurement of the lineal measurement of the product stock which has passed through the cutting apparatus.

It should be understood that any type of pulse generating mechanism which is capable of generating an electrical signal, and preferably discrete pulses, representative of the lineal measurement of product stock, could be employed.

Also in the embodiment as illustrated, the pulse generator 96 internally includes a sensor which literally detects the number of rotations of the shaft 98. The pulse generator will thereupon cause a generation of output pulses representative of this lineal measurement of product stock. The term pulse generator is used in a broad sense to encompass shaft encoders and the like. In effect, any device which generates the electrical signal corresponding to the lineal measurement of product stock would be suitable for this purpose and is encompassed by the term "pulse generator".

The pulse generator 96 generates a negative polarity pulse which is introduced into an inverter 102 in order to produce a positive polarity pulse, in the manner as schematically shown in FIG. 3. It can also be observed that a five volt power source is connected through a resistor 104 to the inverter 102. The output of the inverter 102 is introduced into a NAND gate 106 which also receives an input from a limit switch 108 also in the manner as shown in FIG. 3.

When the board of wood stock is passing through the cutting apparatus, it may roll over a feed roller, which in this case, may be the movable member 98. The board or other wood stock will then contact the limit switch 108 which will allow pulses to pass through the NAND gate and enable the initiation- of a start signal. This will enable the circuit to start the measurement of a length of wood passing through the cutting apparatus. The trailing end of that same piece of wood will actuate the same limit switch 108 which will disable the pulse circuit. In effect, the limit switch 108 will start and end the stream of pulses generated by the pulse generator 96. In this way, the microcomputer 74 is furnished information regarding the starting and ending times during which to measure the length of a piece of wood stock which has been cut. Thus, the microcomputer is properly advised of the the number of pulses received in a time interval and is thereby advised of a length of wood stock or other product stock which is passing through the cutting apparatus.

It should be understood that other types of interrupt circuits could be used in accordance with the present invention. For example, optical sensors which detect the presence of a board or the absence of a board could be used in or as part of the interrupt circuit. The interrupt signals are important in that they effectively provide information about the length of piece of product stock which is passing through the apparatus. This information is furnished to the microprocessor 74 so that the determination of the length of product stock of a particular width can be added to the pre-recorded length of product stock of that same width which has been measured by the apparatus.

The output circuit 92 includes an output bus 112 comprised of four individual conductors, as shown. The output-conductors 112 are connected to a decoder 114 and which is, in turn, connected to individual counters 116. Only five counters 16 are employed, but it should be understood that this number can vary. If desired, a reset circuit would be connected to the decoder 114 or to the individual meters 116. The output circuit 92 is designed to receive the output of the microcomputer and convert the same into a form usable by the meters 116. Thus, for example, the output circuit could include a digital-to-analog converter. Generally, output circuits of this type are conventional and are therefor neither illustrated nor described in any further detail herein.

The microcomputer 74 effectively conducts a continuous polling operation of each of the ports 76 in the port circuit 68, as aforesaid. Further, the microcomputer receives information about any particular width from the interrupt circuit. The microcomputer will effectively compare each programmed width of board or other product stock with the data on each port chip. If it finds a match, then the microcomputer will provide the lineal measurement of wood stock for that particular width to a particular meter 116 and will thereby increment or advance that meter 116. In essence, the microcomputer 74 operates by counting pulses which are generated. The pulses actually represent a portion of a lineal inch of wood which has moved through the cutting elements. Therefore, the microcomputer also operates in a counting function to literally add the individual increments of wood passing through the cutting elements The microcomputer also operates as a multiplier.

In the embodiment of the invention as illustrated, there are four individual conductors 112 from the port circuit 68 to the decoder 114. There is a single bi-directional data bus from the microprocessor 74 to the port circuit 68 as shown in FIGS. 1 and 2. This bus transmits data from the microcomputer 74 to the port circuit 68 and transmits data from the port circuit 68 to the microcomputer 74. The address and control bus 86 is undirectional and sends address and control information from the microcomputer 74 to the port circuit 68. The information from the microcomputer 74 is routed by the decoder 114 to the appropriate meters 116 according to the width of each piece of wood which was cut. Thus, for each piece of wood which was cut, the decoder 114 will pass that measurement information from the port circuit 68 to the proper meter 116. The decoder 114 effectively decodes from a four bit binary number from the port circuit so that information can be properly delivered to the appropriate output device, where there may be five or more such output devices.

Thus, there has been illustrated and described a unique and novel lineal output measurement circuit which is capable of measuring the individual amount of product of selected dimensions which have been cut from product stock in a production cutting apparatus on a highly accurate basis and which may be installed in existing apparatus or included in new production apparatus. Thus, the present invention fulfills all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention which is limited only by the following claims.

Having thus described the invention, what I desire to claim and secure by letters patent is:

1. A measurement circuit for measuring the product output of a production cutting apparatus capable of cutting different sized product sections from a piece of product stock and which production cutting apparatus generates a plurality of first electrical signals and a plurality of second electrical signals which can be used for controlling the operation of electrical control members which set the positions of cutting elements in response to operation of operator input controls, said circuit comprising:

(a) a first conductive means for receiving the first electrical signals and producing first program signals which are representative of selected ones of a plurality of output indicators, (b) second conductive means for receiving the second electrical signals and producing second program signals which are representative of the sizes of product sections to be cut from the product stock, the second electrical signals also being delivered to each of the electrical control members and used for positioning the cutting elements on the cutting apparatus, (c) a port circuit receiving the first program signals and the second program signals, said port circuit also receiving the second electrical signals delivered to the control members, (d) processing means connected to the port circuit for receiving the first program signals and the second program signals for enabling the processing means to be programmed in a manner to correlate product sizes with an associated output indicator, said processing means enabling a calculation of the amount of the product sections cut from product stock and providing output signals representing the amount of each of the product sections, and (e) output indicator means for providing a visual indication of the amount of each of the product sections cut from the product stock.

2. The measurement circuit of claim 1 further characterized in that said measurement circuit comprises separate interface circuits located in said first and second conductive means for enabling the producing of the first and second program signals.

3. The measurement circuit of claim 2 further characterized in that said measurement circuit comprises separate interface circuits in conductors from the control members to the port circuit to receive the second electrical signals delivered to each cutting member and transmitting these signals to the port circuit.

4. The measurement circuit of claim 3 further characterized in that an encoder is interposed in the first conductive means and encodes the first electrical signals to provide the first program signals.

5. The measurement circuit of claim 3 further characterized in that said port circuit receives the outputs from the interface circuits.

6. The measurement circuit of claim 1 further characterized in that said measurement circuit comprises an interrupt circuit having means for measuring the movement of the product stock through the production cutting apparatus to determine the time during which measurement should commence and end for product stock being cut by each of the cutting elements.

7. The measurement circuit of claim 6 further characterized in that said interrupt circuit comprises pulse generator means for generating pulse signals representative of the lineal measurement of product passing through the production cutting apparatus.

8. The measurement circuit of claim 7 further characterized in that the pulse signals are initiated and stopped by signals from a limit switch.

9. The measurement circuit of claim 1 further characterized in that said port circuit receives the product output signals and comprises a port which provides product output signals to the output indicator means.

10. The measurement circuit of claim 9 further characterized in that said port circuit has a pair of ports which receive the first and second program signals and separate additional ports to receive the second electrical signals delivered to the control members.

11. A measurement circuit for measuring the product output of a production cutting apparatus capable of cutting different sized product sections from a piece of product stock and which production cutting apparatus generates a plurality of first electrical signals and a plurality of second electrical control signals which can be used for controlling the operation of electrical control members which set the positions of cutting elements in response to operation of operator input controls, said circuit comprising;
 (a) means for generating program signals representative of the different sizes of the product sections which are to be cut from the product stock,
 (b) a port circuit comprised of:
  (1) at least one port for receiving the program signals from the means for generating program signals,
  (2) a plurality of second ports for receiving electrical signals delivered to each of the electrical control members operating the cutting elements on the cutting apparatus,
 (c) processing means connected to the said port circuit for receiving the program signals and generating a separate output for each different size of product section to be cut from the product stock, said processing means continuously polling the second ports and determining if there is a signal at any of the second ports corresponding to any of the separate outputs,
 (d) interrupt circuit means for measuring the length of each piece of product stock which is being cut in the apparatus and providing that measurement to the processing means, said processing means thereafter correlating the length of product stock being cut to a particular size of product section so that a calculation of the length of each of the product sections cut from product stock can be made and generating output signals for each separate output representing the amount of each of the product sections cut from the product stock, and
 (e) output indicator means receiving the output signals for providing a visual indication of the amount of each of the product sections cut from the product stock.

12. The measurement circuit of claim 11 further characterized in that said measurement circuit comprises separate interface circuits for receiving the electrical control signals and providing signals to the port circuit which correspond to the electrical control signals.

13. The measurement circuit of claim 11 further characterized in that said processing means continuously and sequentially polls each of the second ports to determine if there are electrical signals at such second ports representative of a particular size and comparing that signal to a preselected size to determine if there is a correspondence and then determining a length of product section being cut if there is a correspondence.

14. The measurement circuit of claim 11 further characterized in that said interrupt circuit comprises a pulse generator means for generating pulse signals representative of the linear measurement of product passing through the cutting apparatus.

15. The measurement circuit of claim 14 further characterized in that the pulse signals are initiated and terminated by signals from a limit switch.

16. The measurement circuit of claim 11 further characterized in that said port circuit receives address and control signals from the processing means to control shifting of data from the port circuit to the processing means.

17. The measurement circuit of claim 16 further characterized in that said port circuit receives the product output signals from the processing means and has a port which provides the product output signals to the output indicator means.

18. A production cutting apparatus having a plurality of cutting elements which are capable of operation for simultaneously cutting product sections of the same or differing dimensions from a piece of product stock, said production cutting apparatus comprising:
 (a) a plurality of manually actuable switches which are actuable by an operator to control the dimensions for each of the product sections,
 (b) means connected to said manually actuable switches for providing first program signals and each of these program signals being representative of individual ones of a plurality of output indicators,
 (c) a matrix of electrical signal generating elements operatively connected to said manually actuable switches for generating a plurality of electrical control signals representing dimensions for each of the product sections,
 (d) means receiving the control signals and providing second program electrical signals representative of the size of the product sections to be cut and with each size associated with a particular output indicator,
 (e) a plurality of cutting elements located to cut a piece of product stock into product sections and which cutting elements are moveable relative to one another to control the dimensions of the product sections,
 (f) electrical control members operatively connected to said matrix of signal generating elements for receiving the electrical control signals and controlling the positions of the cutting elements in response to the electrical control signals,
 (g) a port circuit receiving the first and second program signals and the electrical control signals delivered to the control members,
 (h) processing means connected to said port circuit for receiving the first and second program signals to thereby enable the processing means to be programmed in a manner to correlate electrical control signals with certain pre-selected sizes of product sections, said processing means enabling a calculation of the amount of the product sections cut from product stock and providing output signals representing the amount of each of the product sections, and (i) output indicator means for providing a visual indication of the amount of each of the product sections cut from the product stock.

19. The production cutting apparatus of claim 18 further characterized in that the cutting elements are operable in the same direction to make generally parallel cuts in the product stock.

20. The product cutting apparatus of claim 18 further characterized in that the electrical control members comprise relays and solenoids which control the positions of the cutting elements, and a latching circuit is connected to said control members to hold the solenoids in positions established in accordance with the electrical control signals delivered to the relays.

21. The production cutting apparatus of claim 18 further characterized in that said apparatus comprises separate interface circuits located to receive the program signals and the electrical control signals associated with each cutting element, and which interface circuits have outputs connected to the port circuit.

22. The production cutting apparatus of claim 18 further characterized in that said apparatus comprises an interrupt circuit having means for measuring the movement of the product stock through the production cutting apparatus to determine the time in which measurement should commence and end for product stock being cut by each of the cutting elements.

* * * * *